US012142230B2

(12) United States Patent
Lim et al.

(10) Patent No.: US 12,142,230 B2
(45) Date of Patent: *Nov. 12, 2024

(54) DISPLAY DEVICE

(71) Applicant: LG Display Co., Ltd., Seoul (KR)

(72) Inventors: HyunKyo Lim, Paju-si (KR); DongSup Sim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,058

(22) Filed: Sep. 22, 2023

(65) Prior Publication Data

US 2024/0013733 A1 Jan. 11, 2024

Related U.S. Application Data

(63) Continuation of application No. 17/955,399, filed on Sep. 28, 2022, now Pat. No. 11,798,499.

(30) Foreign Application Priority Data

Sep. 30, 2021 (KR) ........................ 10-2021-0130006

(51) Int. Cl.
*G09G 3/3291* (2016.01)
*G09G 3/20* (2006.01)
(Continued)

(52) U.S. Cl.
CPC ......... *G09G 3/3291* (2013.01); *G09G 3/2007* (2013.01); *G09G 3/2096* (2013.01);
(Continued)

(58) Field of Classification Search
CPC .. G09G 3/3291; G09G 3/2007; G09G 3/2096; G09G 3/3233; G09G 3/3266
See application file for complete search history.

(56) References Cited

U.S. PATENT DOCUMENTS 11,263,989 B2 3/2022 Shin et al.
11,869,446 B2 1/2024 Park et al.
(Continued)

FOREIGN PATENT DOCUMENTS

CN 112771602 A 5/2021
CN 113314083 A 8/2021
TW 202103125 A 1/2021

OTHER PUBLICATIONS

Taiwan Intellectual Property Office, Office Action, Taiwanese Patent Application No. 111136843, Jun. 12, 2023, 10 pages.
(Continued)

*Primary Examiner* — Sardis F Azongha
(74) *Attorney, Agent, or Firm* — Fenwick & West LLP

(57) ABSTRACT

A display device according to embodiments of the present disclosure may include a display panel, a data driver configured to drive by dividing a diving period into an active period and a blank period, and apply a parking voltage during the blank period, and a controller configured to vary a driving frequency in frame units according to an input image, and, according to the driving frequency, to operate a frame as a refresh frame for writing the data voltage, or operate by dividing the frame into the refresh frame and a hold frame, wherein a voltage level of the parking voltage varies according to the driving frequency. Accordingly, it is possible to prevent a stripe defects and improve the uniformity of the display panel by reducing the mura of a parking voltage, thereby improving image quality.

19 Claims, 12 Drawing Sheets

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0819* (2013.01); *G09G 2300/0842* (2013.01); *G09G 2310/08* (2013.01); *G09G 2320/0233* (2013.01); *G09G 2320/0247* (2013.01); *G09G 2320/0257* (2013.01)

(56) References Cited

U.S. PATENT DOCUMENTS

| | | | |
|---|---|---|---|
| 2021/0012711 | A1 | 1/2021 | Huang et al. |
| 2021/0272531 | A1 | 9/2021 | Shin et al. |
| 2021/0327368 | A1 | 10/2021 | Park et al. |

OTHER PUBLICATIONS

United States Office Action, U.S. Appl. No. 17/955,399, filed Mar. 16, 2023, 10 pages.
Taiwan Intellectual Property Office, Office Action, Taiwanese Patent Application No. 111136843, Nov. 14, 2023, 11 pages.

DISPLAY DEVICE

CROSS REFERENCE TO RELATED APPLICATION

This application is a continuation application of U.S. patent application Ser. No. 17/955,399 filed on Sep. 28, 2022, which claims priority from Korean Patent Application No. 10-2021-0130006, filed on Sep. 30, 2021, all of which are hereby incorporated by reference for all purposes as if fully set forth herein.

TECHNICAL FIELD

Embodiments of the present disclosure relates to a display device, more particularly, to a display device capable of improving the degradation of uniformity due to mura such as flicker and stains.

BACKGROUND

A display device implementing a variety of information on a screen is an important technology in the information and communication era, and has been developing in the direction of being thinner, lighter, and more portable and high-performance. Accordingly, a display device capable of being manufactured in a lightweight and thin form has been in the spotlight. A display device using a self-luminous element is not only advantageous in terms of power consumption due to low voltage driving, but also has excellent high-speed response, high luminous efficiency, viewing angle, and contrast ratio, and is being studied as a next-generation display device. The display device implements an image through a plurality of sub-pixels arranged in a matrix form. Each of the plurality of sub-pixels includes a light emitting device and a pixel circuit such as a plurality of transistors independently driving the light emitting device.

Specific examples of such a flat panel display may include a liquid crystal display (LCD), a quantum dot display (QD), a field emission display apparatus (FED), an organic light emitting diode (OLED) display, etc. The organic light emitting diode (OLED) display, which does not require a separate light source and is spotlighted as a means for compact device and vivid color display, uses an organic light emitting diode (OLED) for emitting light by itself, and has advantages of a fast response speed, a high contrast ratio, a high luminous efficiency, a high luminance, and a large viewing angle.

The organic light emitting diode display device including an organic light emitting diode has various advantages since the device displays an image based on light generated from a light emitting device in a pixel. However, the uniformity defects may occur due to mura such as flicker and stains caused by coupling between internal lines of pixels during driving or operating conditions of driving signals. This may be a factor of lowering satisfaction with image quality of the display device.

Accordingly, various driving techniques have been developed to solve image abnormalities, and in order to improve image quality, it is necessary to improve operating performance by controlling driving conditions of pixels.

SUMMARY

An object of embodiments of the present disclosure is to provide a display device capable of improving a flicker and uniformity degradation by controlling a driving voltage condition of a pixel circuit.

In an aspect of the present disclosure, there is provided a display device including a display panel including a plurality of pixels connected to a data line and a gate line, a data driver configured to drive by dividing a diving period into an active period in which a data voltage is applied to the data line and a blank period in which the data voltage is not applied, and apply a parking voltage during the blank period, a gate driver configured to apply a scan signal to the gate line, and a controller configured to drive by varying a driving frequency in frame units according to an input image, and, according to the driving frequency, to operate a frame as a refresh frame for writing the data voltage, or operate by dividing the frame into the refresh frame and a hold frame for maintaining the data voltage written in the refresh frame, wherein a voltage level of the parking voltage may vary according to the driving frequency.

In another aspect of the present disclosure, there is provided a display device including a data driver configured to supply a data voltage during an active period and supply a parking voltage during a blank period, and a controller configured to operate a frame as a refresh frame for writing the data voltage and/or a hold frame during which the data voltage written in the refresh frame is maintained, according to a driving frequency, wherein the parking voltage has different voltage levels in the refresh frame and the hold frame.

In addition to the technical problems of the present disclosure mentioned above, other features and advantages of the present disclosure may be described below, or will be clearly understood by those skilled in the art from such description.

According to embodiments of the present disclosure, it is possible to prevent stripe defects and improve the uniformity of the display panel by reducing the mura of a parking voltage, thereby improving image quality.

Effects according to the present disclosure are not limited to the contents exemplified above, and more various effects may be included in the present disclosure.

DETAILED DESCRIPTION

Figure 1:
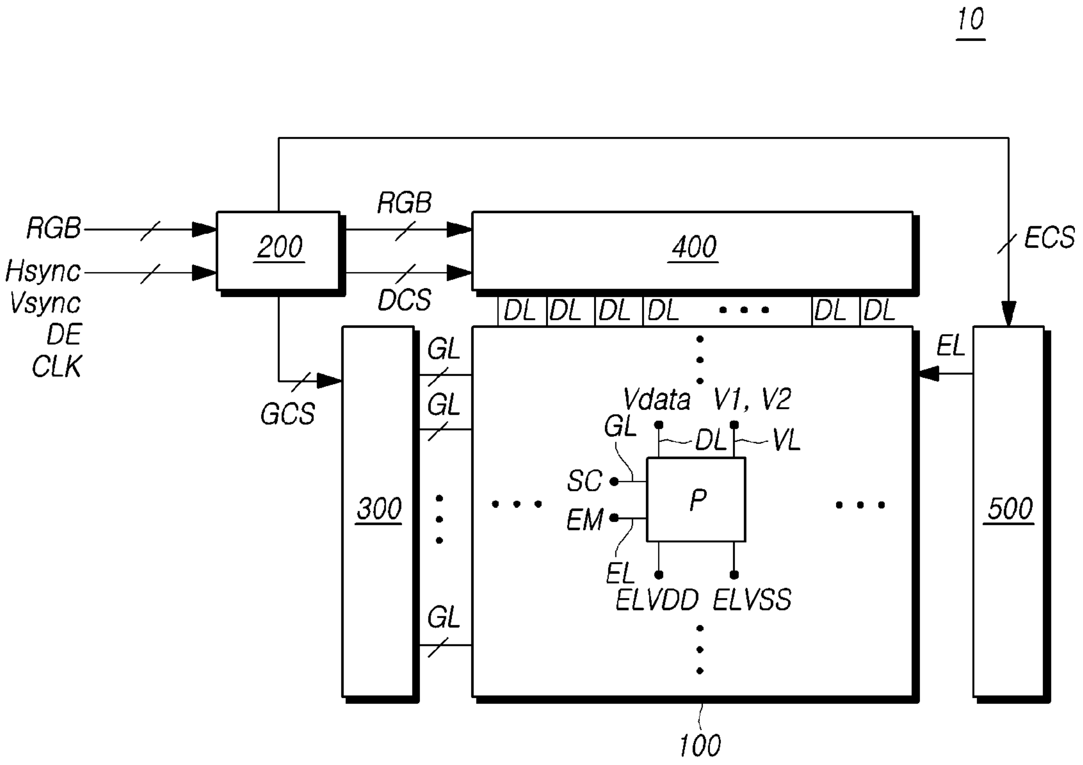
FIG. 1 is a block diagram of a display device according to an embodiment of the present disclosure.

The advantages and features of the present disclosure and a method therefor will become apparent with reference to the embodiments described below in detail in conjunction with the accompanying drawings. However, the present disclosure is not limited to the embodiments disclosed below, but will be implemented in various different forms. The present embodiments are provided to only explain the disclosure of the present specification is complete, and to completely inform those of ordinary skill in the art of this specification the scope of the invention, and the specification will be defined by the scope of the claims.

The shape, size, ratio, angle, number, etc. disclosed in the drawings for explaining the embodiment in the present specification are exemplary and the embodiment of the present specification is not limited to the illustrated matters. In addition, in describing the embodiment, if it is determined that a detailed description of a related known technology may unnecessarily obscure the gist of the embodiment, the detailed description thereof will be omitted.

In the case that the terms of 'include', 'have', 'consist', 'comprise' etc. are used in this specification, it should be understood as being able to add other parts or elements unless 'only' is used. When an element is expressed in the singular, there may be understood to include cases including the plural unless otherwise explicitly stated.

In addition, in interpreting the elements, it should be interpreted as including an error range even if there is no separate explicit description.

In the description related to spatial relationship, for example, when the positional relationship of two element is described using the terms of "on", "upper", "above", "below", "under", "beneath", "lower", "near", "close", "adjacent", it should be interpreted that one or more elements may be further "interposed" between the elements unless the terms such as "directly", "only" are used.

In the case of a description of a temporal relationship, for example, when a temporal relationship is described as 'after', 'following', 'next', 'then', 'before', it may include cases that are not continuous unless 'immediately' or 'directly' is used.

When the terms, such as "first", "second", or the like, are used herein to describe various elements or components, it should be considered that these elements or components are not limited thereto. These terms are merely used herein for distinguishing an element from other elements. Therefore, a first element mentioned below may be a second element in a technical concept of the present disclosure.

The term "at least one" should be understood to include all possible combinations of one or more related elements. For example, the meaning of "at least one of the first, second, and third elements" may mean all combinations of two or more elements of the first, second and third elements as well as each of the first, second or third element.

The features of each of the embodiments of the present specification may be partially or wholly combined or coupled with each other, and may be various technically linked or operated. In addition, each of the embodiments may be implemented independently of each other or may be implemented together in a related relationship.

Hereinafter, it will be described embodiments of a display device according to the present disclosure with reference to the drawings. In adding reference numerals to components of each drawing, the same components may have the same reference numerals as much as possible even though they are indicated on different drawings. In addition, since the scales of the components shown in the accompanying drawings may have different scales from the actual for convenience of description, the scales shown in the drawings are not limited thereto.

Hereinafter, it will be described embodiments of the present disclosure in detail with reference to the accompanying drawings.

FIG. 1 is a block diagram of a display device according to an embodiment of the present disclosure.

Referring to FIG. 1, a display device 10 may include a display panel 100 including a plurality of pixels, a gate driver 300 supplying a gate signal to each of the plurality of pixels, a data driver 400 supplying a data signal to each of the plurality of pixels, a light emission signal generator 500 for supplying the light emission signal to each of the plurality of pixels, and a controller 200.

The controller 200 may process the image data RGB input from the outside according to a size and resolution of the display panel 100 and supply the processed image data to the data driver 400. The controller 200 may use synchronization signals SYNC input from the outside, for example, a dot clock signal CLK, a data enable signal DE, a horizontal synchronization signal Hsync, and a vertical synchronization signal Vsync to generate a plurality of gate control signal GCS, data control signals DCS, and emission control signals ECS. The generated plurality of gate control signal GCS, data control signals DCS, and emission control signals ECS may be supplied to the gate driver 300, the data driver 400 and the light emission signal generator 500 to control the gate driver 300, the data driver 400 and the light emission signal generator 500, respectively.

The controller 200 may be configured in combination with various processors, for example, a microprocessor, a mobile processor, an application processor, etc. depending on the device to which the controller is mounted.

The controller 200 may generate signals so that the pixels can be driven at various refresh rates. That is, the controller 200 may generate driving-related signals so that the pixel is driven in a variable refresh rate (VRR) mode or switchable between a first refresh rate and a second refresh rate. For example, the controller 200 may simply change a speed of the clock signal, generate a synchronization signal to generate a horizontal blank or a vertical blank, or drive the gate driver 300 in a mask method so as to drive the pixels at various refresh rates.

Each of the plurality of pixels P may be driven through a combination of a refresh frame and a hold frame according to a refresh rate within one frame.

For example, if the refresh rate is driven at 120 Hz, only the refresh frame may be driven, and if the refresh rate is driven at 10 Hz, the refresh frame and the hold frame may be driven alternately. That is, within one frame, one refresh frame and a plurality of hold frames are configured as one set and may be driven to repeat.

In addition, the controller 200 may generate various signals for driving the pixel at the first refresh rate, and in particular, when driven at the first refresh rate, may generate the emission control signal ECS so as for the light emission signal generator 500 to generate the light emission signal EM(n) having a first duty ratio. Thereafter, the controller 200 may operate to drive the pixel at the second refresh rate, and may generate various signals for driving the pixel at the second refresh rate. In particular, when the pixel is driven at the second refresh rate, the controller may generate the emission control signal ECS so that the light emission signal generator 500 generates the emission signal EM(n) having a second duty ratio different from the first duty ratio.

The gate driver 300 may supply the scan signal SC to a gate line GL according to the gate control signal GCS supplied from the controller 200. Although FIG. 1 illustrates that the gate drivers 300 are spaced apart from one side of the display panel 100, the number and arrangement positions of the gate drivers 300 are not limited thereto. That is, the gate driver 300 may be disposed on one side or both sides of the display panel 100 in a gate-in-panel (GIP) method.

The data driver 400 converts the image data RGB into a data voltage Vdata according to the data control signal DCS supplied from the controller 200, and supplies the converted data voltage Vdata to the pixel through a data line DL.

In the display panel 100, a plurality of gate lines GL, a plurality of emission lines EL, and a plurality of data lines DL may cross each other, and each of the plurality of pixels may be connected to the gate line GL, the emission line EL and the data line DL. Specifically, one pixel receives the gate signal from the gate driver 300 through the gate line GL, receives the data signal from the data driver 400 through the data line DL, receives the emission signal EM(n) through the emission line EL, and receives various power signals through a power supply line. Here, the gate line GL supplies the scan signal SC, the emission line EL supplies the emission signal EM(n), and the data line DL supplies the data voltage Vdata. However, according to various embodiments, the gate line GL may include a plurality of scan signal lines, and the data line DL may additionally include a plurality of power supply lines VL. Also, the emission line EL may include a plurality of emission signal lines. In addition, one pixel receives a high potential voltage or a first power voltage ELVDD and a low potential voltage or a second power voltage ELVSS. In addition, first and second bias voltages V1 and V2 may be supplied through one or more power supply lines VL.

In addition, each pixel includes a light emitting device ELD and a pixel circuit for controlling driving of the light emitting device ELD. Here, the light emitting device ELD includes an anode, a cathode, and an organic light emitting layer between the anode and the cathode. The pixel circuit includes a plurality of switching devices, a driving switching device, and a capacitor. Here, the switching device may be constituted by a TFT, and in the pixel circuit, a driving TFT controls the amount of current supplied to the light emitting device ELD according to the difference between the data voltage charged in the capacitor and the reference voltage, thereby adjusting the amount of light emitted by the light emitting device ELD. In addition, a plurality of switching TFTs receive the scan signal SC supplied through the gate line GL and the emission signal EM(n) supplied through the emission line EL to charge the data voltage Vdata to the capacitor.

The display device 10 according to the embodiment of the present disclosure may include, for driving the display panel 100 including a plurality of pixels, the gate driver 300, the data driver 400, the light emission signal generator 500 and a controller 200 for controlling them. Here, the light emission signal generator 500 may be configured to adjust the duty ratio of the emission signal EM(n). For example, the light emission signal generator 500 may include a shift register and a latch for adjusting the duty ratio of the emission signal EM(n). When the pixel circuit is driven at the first refresh rate according to the emission control signal ECS generated by the controller 200, the light emission signal generator 500 may generate an emission signal having a first duty ratio and supply the emission digonal to the pixel circuit. When the pixel circuit is driven at the second refresh rate, the light emission signal generator 500 may be configured to generate and supply an emission signal having a second duty ratio different from the first duty ratio to the pixel circuit.

Figure 2A:
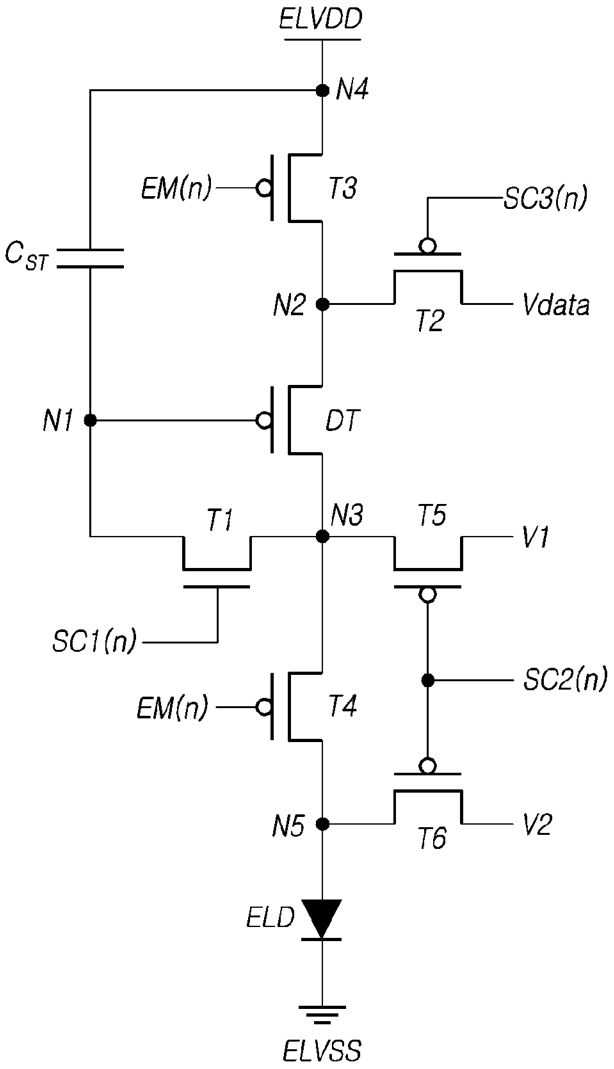
FIGS. 2A to 2C are circuit diagrams illustrating a pixel circuit of a display device according to an embodiment of the present disclosure.
Figure 2B:
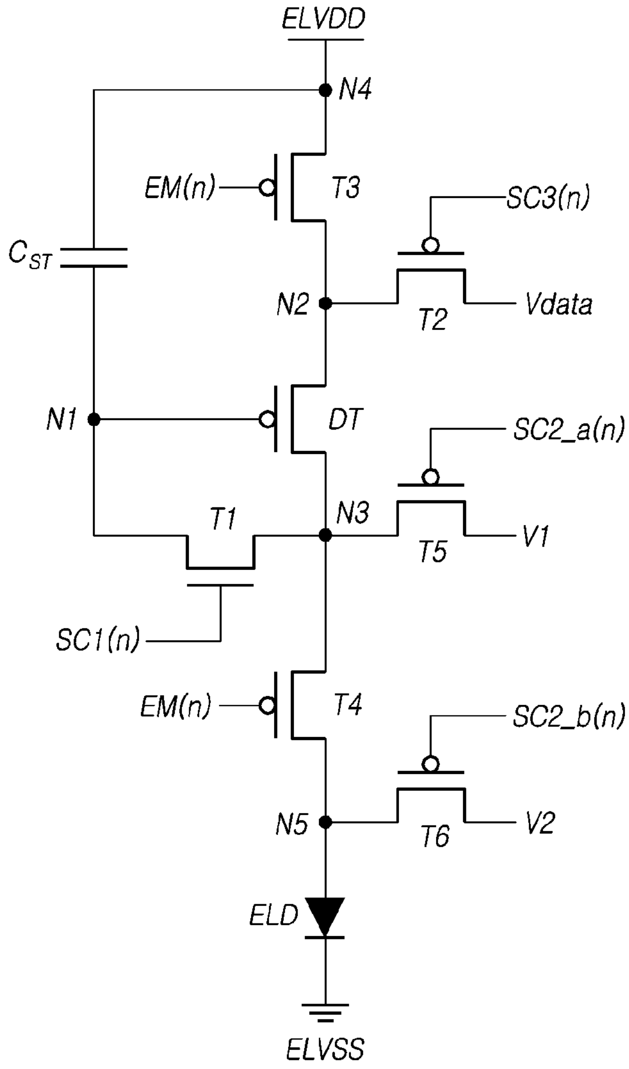
Figure 2C:
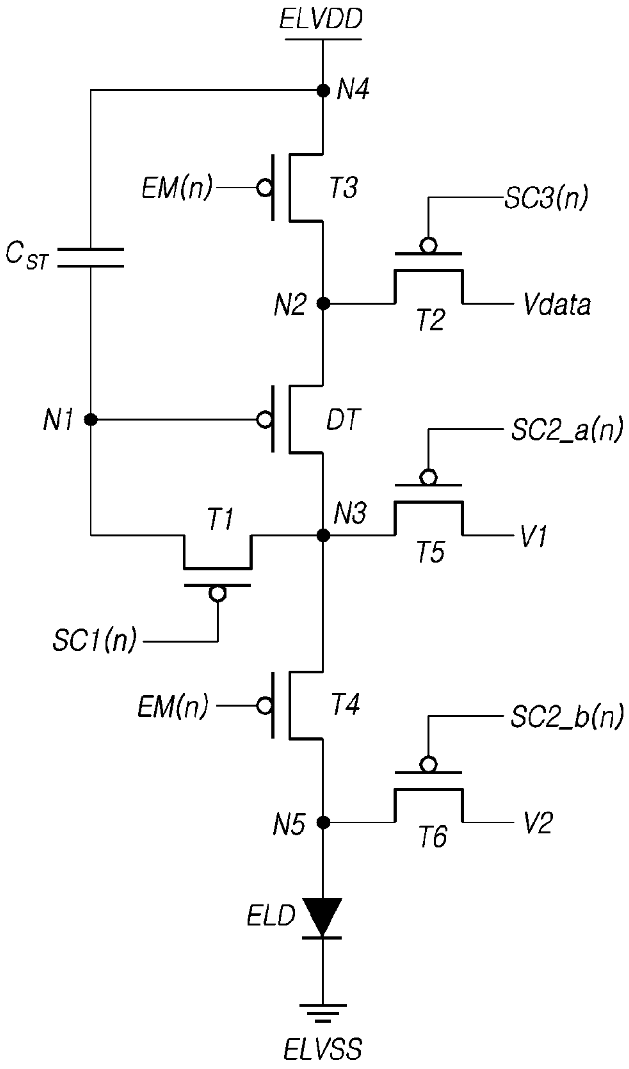

FIGS. 2A to 2C are circuit diagrams illustrating a pixel circuit of a display device according to an embodiment of the present disclosure.

FIGS. 2A to 2C exemplifies a pixel circuit for explanation, and is not limited thereto, as long as it has a structure capable of controlling light emission of the light emitting device ELD by applying the emission signal EM(n). For example, the pixel circuit may include an additional scan signal, a switching TFT connected thereto, and a switching TFT to which an additional initialization voltage is applied, and a connection relationship between switching devices or a connection position of a capacitor may be variously disposed. That is, if the light emission of the light emitting device ELD is controlled according to a change in the duty ratio of the emission signal EM(n) and the light emission can be controlled according to the refresh rate, other pixel circuits having various structures may be used. For example, various pixel circuits such as 3T1C, 4T1C, 6T1C, 7T1C, and 7T2C may be used. Hereinafter, it will be described a display device including the pixel circuit of 7T1C of FIGS. 2A to 2C for convenience of description.

Referring to FIG. 2A, each of the plurality of pixels P may include a pixel circuit including a driving transistor DT and a light emitting device ELD connected to the pixel circuit.

The pixel circuit may drive the light emitting device ELD by controlling a driving current Id flowing through the light emitting device ELD. The pixel circuit may include the driving transistor DT, first to sixth transistors T1 to T6, and a storage capacitor $C_{ST}$. Each of the transistors DT and T1 to T6 may include a first electrode, a second electrode, and a gate electrode. One of the first and second electrodes may be a source electrode, and the other of the first and second electrodes may be a drain electrode.

Each of the transistors DT and T1 to T6 may be a PMOS transistor or an NMOS transistor. In the embodiment of FIGS. 2A and 2B, the first transistor T1 is an NMOS transistor, and the other transistors DT and T2 to T6 are PMOS transistors. In addition, in the embodiment of FIG. 2C, the first transistor T1 is also configured as a PMOS transistor.

Hereinafter, it will be exemplarily described a case in which the first transistor T1 is an NMOS transistor, and the remaining transistors DT, T2 to T6 are PMOS transistors. Accordingly, the first transistor T1 is turned on by being applied a logic high voltage, and the other transistors DT, T2 to T6 are turned on by being applied a logic low voltage.

According to an example, the first transistor T1 constituting the pixel circuit may serve as a compensation transistor, the second transistor T2 may serve as a data supply transistor, the third and fourth transistors T3 and T4 may serve as light emission control transistors, and the fifth and sixth transistors T5 and T6 may serve as bias transistors.

The light emitting device ELD may include a pixel electrode (or an anode electrode) and a cathode electrode. The pixel electrode of the light emitting device ELD may be connected to a fifth node N5, and the cathode electrode may be connected to a second power voltage ELVSS.

The driving transistor DT may include a first electrode connected to a second node N2, a second electrode connected to a third node N3, and a gate electrode connected to the first node N1. The driving transistor DT may provide a driving current Id to the light emitting device ELD based on the voltage of the first node N1 (or a data voltage stored in the capacitor $C_{ST}$ to be described later).

The first transistor T1 may include a first electrode connected to the first node N1, a second electrode connected to the third node N3, and a gate electrode receiving a first scan signal SC1($n$). The first transistor T1 may be turned on in response to the first scan signal SC1($n$), and may transmit the data signal Vdata to the first node N1. The first transistor T1 may be diode-connected between the first node N1 and the third node N3 to sample a threshold voltage Vth of the driving transistor DT. The first transistor T1 may be a compensation transistor.

The capacitor $C_{ST}$ may be connected or formed between the first node N1 and a fourth node N4. The capacitor $C_{ST}$ may store or maintain the provided data signal Vdata.

The second transistor T2 has a first electrode connected to the data line DL (or receiving the data signal Vdata), a second electrode connected to the second node N2, and a gate electrode receiving a third scan signal SC3($n$). The second transistor T2 may be turned on in response to the third scan signal SC3($n$), and may transmit the data signal Vdata to the second node N2. The second transistor T2 may be a data supply transistor.

The third transistor T3 and the fourth transistor T4 (or the first and second light emission control transistors) may be connected between the first power voltage ELVDD and the light emitting device ELD, and may form a current movement path through which the driving current Id generated by the driving transistor DT flows.

The third transistor T3 may include a first electrode connected to the fourth node N4 to receive the first power voltage ELVDD, a second electrode connected to the second node N2, and a gate electrode for receiving the emission signal EM(n).

Similarly, the fourth transistor T4 may include a first electrode connected to the third node N3, a second electrode connected to the fifth node N5 (or a pixel electrode of the light emitting device ELD), and a gate electrode receiving the emission signal EM(n).

The third and fourth transistors T3 and T4 may be turned on in response to the emission signal EM(n), and in this case, the driving current Id is provided to the light emitting device ELD, and the light emitting device ELD may emit light with a luminance corresponding to the driving current Id.

The fifth transistor T5 may include a first electrode connected to the third node N3, a second electrode receiving the first bias voltage V1, and a gate electrode receiving a second scan signal SC2($n$).

The sixth transistor T6 may include a first electrode connected to a fifth node N5, a second electrode receiving the second bias voltage V2, and a gate electrode receiving the second scan signal SC2($n$). In FIG. 2A, the gate electrodes of the fifth and sixth transistors T5 and T6 are configured to receive the second scan signal SC2($n$) in common. However, the present disclosure is not limited thereto, and as shown in FIGS. 2B and 2C, the gate electrodes of the fifth and sixth transistors T5 and T6 may be configured to receive separate scan signals SC2_$a$($n$) and SC2_$b$($n$) to be independently controlled.

The sixth transistor T6 may include a first electrode connected to the fifth node N5, a second electrode connected to the second bias voltage V2, and a gate electrode receiving the second scan signal SC2($n$). The sixth transistor T6 may be turned on in response to the second scan signal SC2($n$) before the light emitting device ELD emits light (or after the light emitting device ELD emits light), and may initialize the pixel electrode (or the anode electrode) of the light emitting device ELD by using the second bias voltage V2. The light emitting device ELD may have a parasitic capacitor formed between the pixel electrode and the cathode electrode. In addition, the parasitic capacitor is charged while the light emitting device ELD emits light, so that the pixel electrode of the light emitting device ELD may have a specific voltage. Accordingly, by applying the second bias voltage V2 to the pixel electrode of the light emitting device ELD through the sixth transistor T6, the amount of charge accumulated in the light emitting device ELD may be initialized.

Figure 3A:
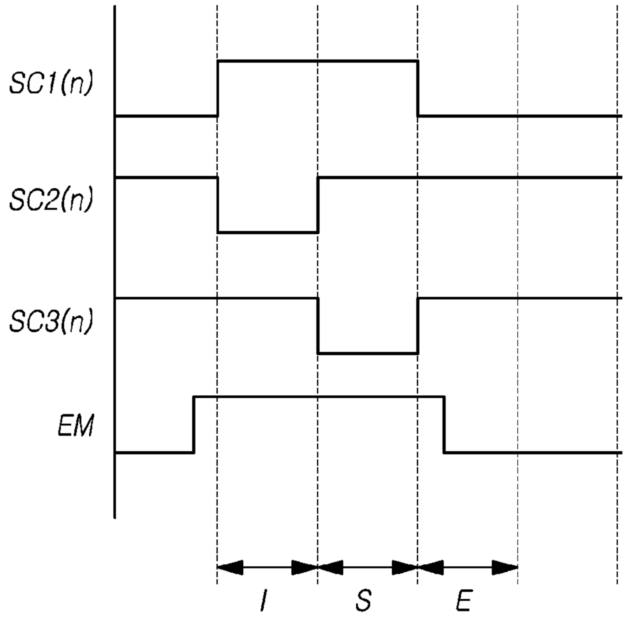
FIGS. 3A and 3B are diagrams for explaining the driving of a pixel circuit in a display device according to an embodiment of the present disclosure.
Figure 3B:
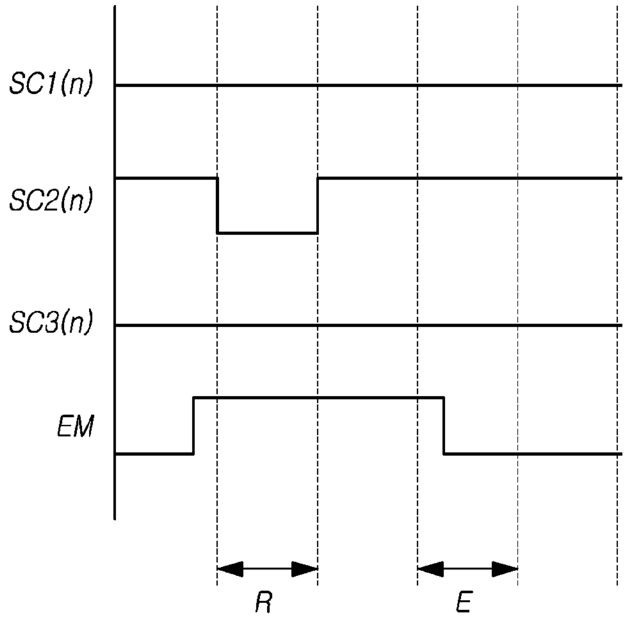

FIGS. 3A and 3B are diagrams for explaining the driving of the pixel circuit in the display device shown in FIGS. 2A to 2C.

Referring to FIGS. 3A and 3B, each of the plurality of pixels P may initialize a voltage charged or remaining in the pixel circuit. Specifically, the influence of the data voltage Vdata and the driving voltage VDD stored in the previous frame may be removed. Accordingly, each of the plurality of pixels P may display an image corresponding to the new data voltage Vdata.

The operation of the pixel circuit may include at least one initialization period, a sampling period, and an emission period, but this is only an example and is not necessarily limited to this order.

Hereinafter, a process of driving the pixel circuit for each initialization period, sampling period, and emission period will be described in detail with reference to FIGS. 3A and 3B.

FIG. 3A illustrates signals applied to the pixel circuit during the refresh frame. In FIG. 3A, I is an initialization period. The initialization period I is a period for initializing the voltage of the gate electrode of the driving transistor DT.

In the initialization period, a first scan signal SC1($n$) is a logic high voltage, and the first transistor T1 is turned on. The second scan signal SC2($n$) is a logic low voltage, and the fifth and sixth transistors T5 and T6 are turned on. As the first and fifth transistors T1 and T5 are turned on, the gate electrode of the driving transistor DT connected to the first node N1 is initialized to the first bias voltage V1. In addition, as the sixth transistor T6 is turned on, the pixel electrode (or the anode electrode) of the light emitting device ELD is initialized to the second bias voltage V2. However, as described above, the gate electrodes of the fifth and sixth transistors T5 and T6 may be configured to be independently controlled by receiving separate scan signals. That is, it is not always required to simultaneously apply the bias voltage to the gate electrode of the driving transistor DT and the pixel electrode of the light emitting device ELD in the initialization period.

In FIG. 3A, S is a sampling period. In the sampling period, a logic low voltage is input to the third scan signal SC3($n$), and the second transistor T2 is turned on. As the second transistor T2 is turned on, the Vdata voltage of the current frame is applied to the drain electrode of the driving transistor DT connected to the second node N2. The first transistor T1 maintains an on state. Since the driving transistor DT is in a diode-connected state when the first transistor T1 is turned on, a voltage of the gate electrode of the driving transistor DT connected to the first node N1 becomes Vdata-|Vth|. That is, the first transistor T1 may be diode-connected between the first node N1 and the third node N3 to sample the threshold voltage Vth of the driving transistor DT.

In FIG. 3A, E is the emission period. The emission period is a period in which the light emitting device ELD emits light with a driving current corresponding to a data voltage sampled after canceling the sampled threshold voltage Vth.

In the emission period, the emission signal EM(n) is a logic low voltage, and the third and fourth transistors T3 and T4 are turned on.

As the third transistor T3 is turned on, the first power voltage ELVDD connected to the fourth node N4 is applied to the drain electrode of the driving transistor DT connected to the second node N2 through the third transistor T3. The driving current Id supplied by the driving transistor DT to the light emitting device ELD via the fourth transistor T4 is independent of the value of the threshold voltage Vth of the driving transistor DT, so that the threshold voltage Vth of the driving transistor DT may be compensated.

FIG. 3B illustrates signals applied to a pixel circuit during a hold frame. In FIG. 3B, R is a reset period. The reset period R is a period for resetting the voltage of the pixel electrode (or the anode electrode) of the light emitting device ELD. During the hold frame, the first scan signal SC1(*n*) is fixed to a logic low voltage, and the third scan signal SC3(*n*) is fixed to a logic high voltage.

In the reset period, the second scan signal SC2(*n*) is a logic low voltage, and the sixth transistor T6 is turned on. As the sixth transistor T6 is turned on, the pixel electrode (or the anode electrode) of the light emitting device ELD is initialized to the second bias voltage V2.

In FIG. 3B, E is an emission period, and in the emission period E of the hold frame, the light emitting device ELD may emit light with a driving current corresponding to the data voltage sampled in the refresh frame.

Figure 4:
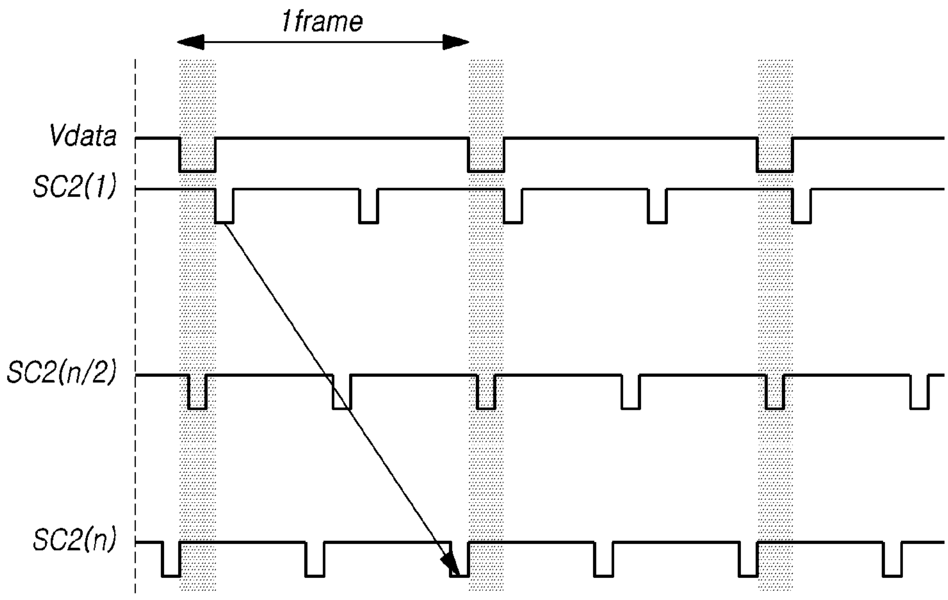
FIG. 4 illustrates an operation of a scan signal for one frame in a display device according to an embodiment of the present disclosure.

FIG. 4 illustrates an operation of a scan signal for one frame in a display device according to an embodiment of the present disclosure.

Referring to FIG. 4, each of the plurality of pixels P is driven at a constant frequency, and may be derived in a variable refresh rate (VRR) mode in which a refresh rate for updating the data voltage Vdata is increased to operate the pixel circuit when the high-speed driving is required, or the refresh rate is decreased to operate the pixel circuit when the low-speed driving or low power consumption is required.

Each of the plurality of pixels P may be driven through a combination of a refresh frame and a hold frame within one frame according to the refresh rate.

During low-speed driving, the refresh frame and the hold frame are alternately driven, and in the hold frame, the pixel electrode of the light emitting device ELD is periodically initialized through the sixth transistor T6 of the pixel circuit, thereby reducing a hysteresis characteristic of the driving transistor DT.

In this case, the second scan signal SC2 supplied from the gate driver 300 to drive the sixth transistor T6 may be driven at a frequency twice higher than a driving frequency supplied from the controller 200 to the display panel 100.

For example, if the refresh rate is 120 Hz, the driving frequency may operate at 120 Hz, and the second scan signal SC2 for turning on the TFT may operate at 240 Hz. That is, since the second scan signal SC2 is driven at a frequency twice higher than the driving frequency, the number of times the sixth transistor T6 is turned on increases and the fifth node N5 is more frequently initialized, thereby improving the performance of the driving transistor DT.

Figure 5:
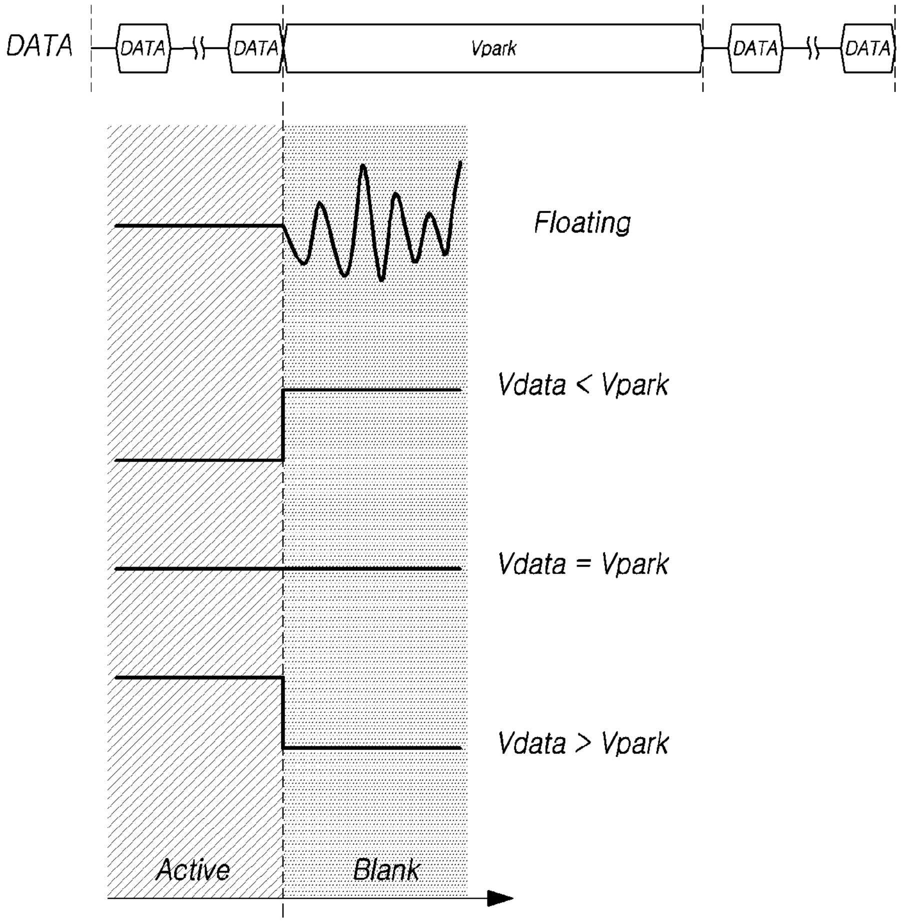
FIG. 5 illustrates a data voltage and a parking voltage in a display device according to an embodiment of the present disclosure.

FIG. 5 illustrates a data voltage and a parking voltage in a display device according to an embodiment of the present disclosure.

Referring to FIG. 5, a period in which the data voltage Vdata is applied may be an active period, and a period in which the data voltage Vdata is not applied may be a blank period. A refresh frame may be included during the active period, and both a refresh frame and a hold frame may be included in the blank period.

When the data line DL is in a floating state during the blank period, the adjacent first and second nodes N1 and N2 may be affected by coupling, which may cause flicker.

Therefore, for a driving in variable refresh rate (VRR) mode, etc., a parking voltage Vpark may be applied during a blank period after the data voltage Vdata is applied to the data line DL and before the data voltage Vdata of the next frame is applied.

In this case of applying a parking voltage Vpark of a specific voltage level, since it is required to control the flicker performance of all gray levels with one parking voltage Vpark, there may be recognized a mura such as a stain in a specific gray level according to the relationship between the data voltage Vdata and the parking voltage Vpark. The mura such as a stain caused by this may be referred to as a parking voltage mura (Vpark Mura).

In addition, when the parking voltage Vpark of a specific voltage level is applied during the blank period, since the second scan signal SC2 sequentially applied to the gate line GL operates at twice the driving frequency, a plurality of pixels located in the central portion of the display panel 100 may operate such that the sixth transistor T6 is turned on. As a result, a coupling occurs between the data line DL and the fifth node N5, which may cause the parking voltage mura (Vpark Mura) in the central region of the display panel 100, thereby reducing uniformity.

The parking voltage mura is more sensitive to a low gray level according to the voltage level of the parking voltage Vpark, and the light emitting device ELD may emit light unnecessarily.

That is, since the voltage level of the required parking voltage Vpark varies according to the luminance, an appropriate parking voltage Vpark is required to be applied to reduce the flicker phenomenon and the parking voltage mura (Vpark Mura).

Figure 6A:
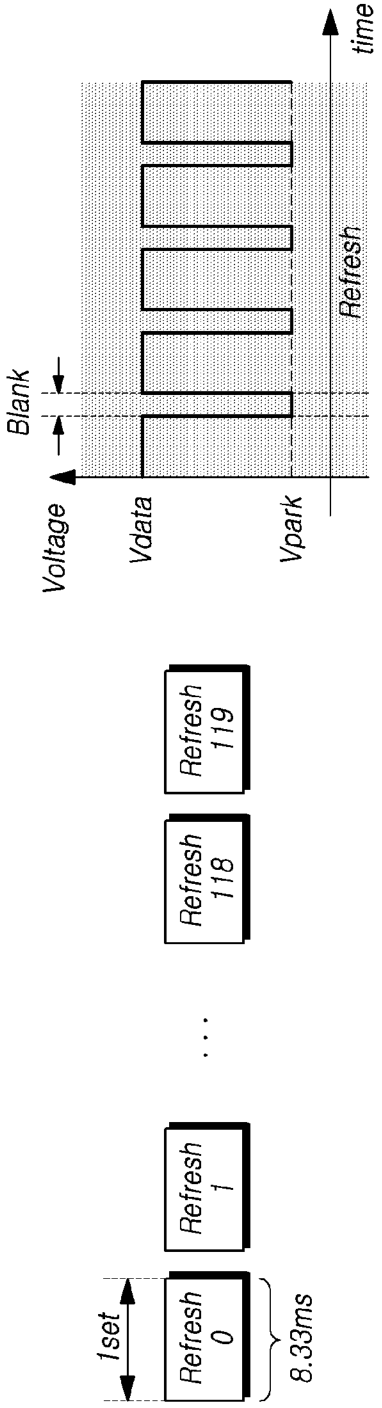
FIGS. 6A and 6B illustrate a refresh frame and a hold frame according to a refresh rate in a display device according to an embodiment of the present disclosure.
Figure 6B:
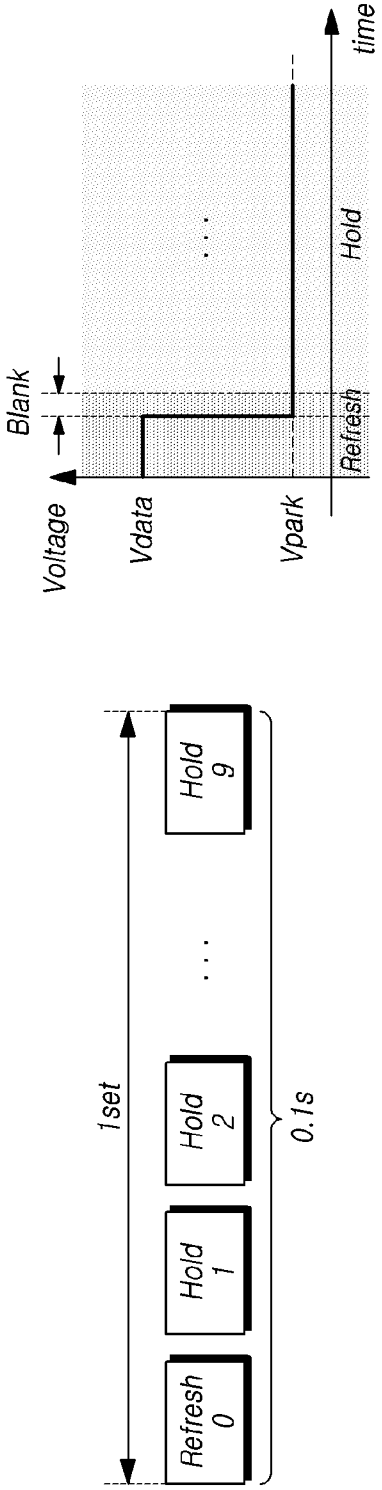

FIGS. 6A and 6B illustrate a refresh frame and a hold frame according to a refresh rate in a display device according to an embodiment of the present disclosure.

Referring to FIGS. 6A and 6B, if the refresh rate is 120 Hz, all of one frame may be composed of a refresh frame, and if the refresh rate is 10 Hz, one frame may be composed of a refresh frame and a hold frame.

The refresh frame and the hold frame are each 1/120 second (=8.33 ms), and when the refresh rate is 120 Hz, one set period consists of only the refresh frame, so one set period is 1/120 second (=8.33 ms). When the refresh rate is 10 Hz, one set period is 1/10 second (=0.1 s).

In FIGS. 6A and 6B, the data voltage Vdata may be applied during an active period, and the active period may be a sampling period S of the refresh frame. In a blank period in which the data voltage Vdata is not applied, the parking voltage Vpark is applied. In this case, the parking voltage Vpark is determined as a voltage level that minimizes flicker in the hold frame. As the voltage difference between the data voltage Vdata and the parking voltage Vpark increases, the parking voltage mura appears stronger. Therefore, due to the luminance change that occurs while the data voltage Vdata and the parking voltage Vpark are repeated in the 120 Hz refresh rate driving consisting of only the refresh frame, a dark and light stripe defect may be recognized. For example, such a dark and light stripe defect can be reduced by changing the voltage level of the parking voltage according to the driving frequency, thereby improving the uniformity of the display panel 100 and improving the image quality. A specific example of changing the voltage level of the parking voltage according to the driving frequency will be described below with reference to FIGS. 7A and 7B, however, the present disclosure is not limited thereto, and the voltage level of the parking voltage may be changed according to the driving frequency in other ways according to actual needs.

Figure 7A:
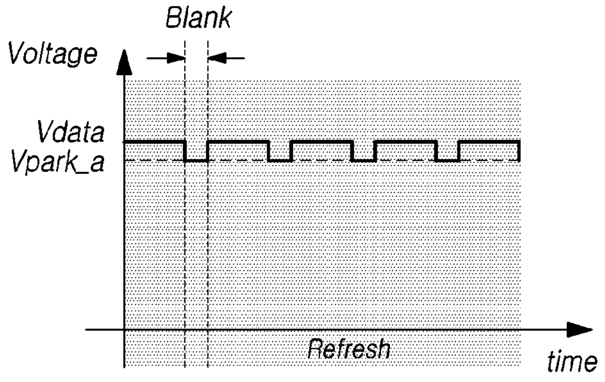
FIGS. 7A and 7B illustrate the parking voltages of a refresh frame and a hold frame in a display device according to an embodiment of the present disclosure.
Figure 7B:
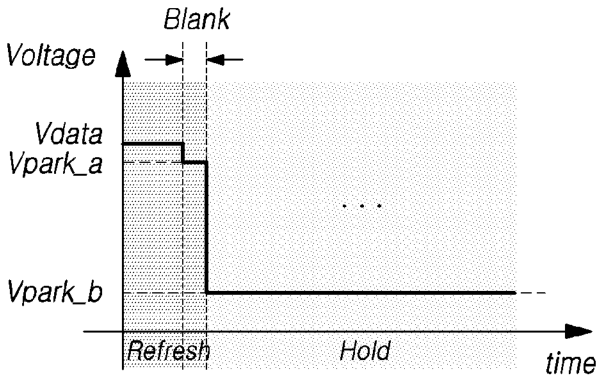

FIGS. 7A and 7B illustrate the parking voltages of a refresh frame and a hold frame in a display device according to an embodiment of the present disclosure.

Referring to FIGS. 7A and 7B, in order to reduce the parking voltage mura generated in the central portion of the display panel 100 when driving at low luminance, the parking voltage Vpark may be set to have different voltage levels in the refresh frame and the hold frame.

Specifically, in the refresh frame, the voltage level of the optimal parking voltage Vpark_a may be set to reduce the voltage difference between the data voltage Vdata and the parking voltage Vpark to improve the parking voltage mura. In addition, in the hold frame, the optimal parking voltage Vpark_b may be set to have a voltage level for reducing flicker.

In FIG. 7A, if the voltage difference between the data voltage Vdata and the parking voltage Vpark is set to be small in the 120 Hz refresh rate driving consisting of only the refresh frame, the visibility of the luminance change may be relatively reduced.

Therefore, in the refresh frame, the optimal parking voltage Vpark_a may be set to the same voltage level as the data voltage Vdata of the low gray level in consideration of the visual evaluation and the data voltages Vdata for each of the plurality of bands.

First, the level of the parking voltage mura is evaluated through visual evaluation to determine the appropriate voltage level section of the optimal parking voltage Vpark_a. In addition, the level of the parking voltage mura is evaluated for each band again, so that the optimal parking voltage Vpark_a can be derived.

In this case, the parking voltage Vpark can be varied and applied according to the process conditions and driving conditions, but since the parking voltage mura is recognized in a low luminance region, the parking voltage may be preferably set to a data voltage Vdata of a low gray level. That is, in the refresh frame, the optimal parking voltage Vpark_a may be set to a data voltage Vdata of 15 gray levels or less.

In FIG. 7B, in driving at a refresh rate of 10 Hz including both the refresh frame and the hold frame, the parking voltage Vpark may have different voltage levels in the refresh frame and the hold frame.

In the refresh frame, the optimal parking voltage Vpark_a may be set to a data voltage Vdata of 15 gray levels or less, in the same way as the 120 Hz refresh rate driving.

In the hold frame, only the parking voltage Vpark is applied without application of the data voltage Vdata, so the optimal parking voltage Vpark_b may be set to have a voltage level that reduces flicker. Since the display panel 100 is most vulnerable to flicker when driven at a refresh rate of 10 Hz, it is preferable to derive the optimal parking voltage Vpark_b based on the 10 Hz refresh rate.

If the same parking voltage Vpark is applied to the refresh frame and the hold frame, the luminance ratio due to the parking voltage mura is about 26%. On the other hand, if the optimal parking voltages Vpark_a and Vpark_b having different voltage levels are applied to the refresh frame and the hold frame, respectively, the stripe defect may be improved and the luminance ratio may be reduced to about 7%.

Accordingly, it is possible to reduce defects such as parking voltage mura and flicker through the optimal parking voltages Vpark_a and Vpark_b having different voltage levels in the refresh frame and the hold frame, respectively.

In addition, since the parking voltage mura is reduced, the uniformity of the display panel 100 may be improved, and image quality may be improved.

A display device according to an embodiment of the present specification may be described as follows.

A display device according to embodiments of the present disclosure may include a display panel comprising a plurality of pixels connected to a data line and a gate line, a data driver configured to drive by dividing a driving period into an active period in which a data voltage is applied to the data line and a blank period in which the data voltage is not applied, and apply a parking voltage during the blank period, a gate driver configured to apply a scan signal to the gate line, and a controller configured to vary a driving frequency in frame units according to an input image, and to operate by dividing a frame into a refresh frame for writing a data voltage or a hold frame, wherein the data voltage written in the refresh frame is maintained during the hold frame, wherein a voltage level of the parking voltage may vary according to the driving frequency.

The controller may be controlled so as for a frame to be composed of one or more refresh frames, or a frame to be composed of (or divided into) one or more refresh frames and one or more hold frames, based on the driving frequency that varies in units of a frame according to the input image. Here, the refresh frame may mean a period (interval) in which a data voltage is written, and the hold frame may mean a period (interval) in which the data voltage written in the refresh frame is maintained.

In the display device according to embodiments of the present disclosure, the parking voltage may have different voltage levels in the refresh frame and the hold frame.

In the display device according to embodiments of the present disclosure, the parking voltage may be a first parking voltage Vpark_a having the same voltage level as a data voltage of a low gray level in the refresh frame.

In the display device according to embodiments of the present disclosure, the first parking voltage Vpark_a may be a data voltage of 15 gray levels or less.

In the display device according to embodiments of the present disclosure, the parking voltage may be a second parking voltage Vpark_b having a voltage level for reducing flicker in the hold frame.

In the display device according to embodiments of the present disclosure, the second parking voltage Vpark_b may be derived based on a 10 Hz refresh rate.

In the display device according to embodiments of the present disclosure, the controller may vary the driving frequency according to a refresh rate, and the gate driver may apply a scan signal having a higher frequency than the driving frequency.

In the display device according to embodiments of the present disclosure, the frequency of the scan signal may be twice the driving frequency.

A display device according to embodiments of the present disclosure may include a data driver configured to supply a data voltage during an active period and supply a parking voltage during a blank period, and a controller configured to operate a frame as a refresh frame for writing the data voltage and/or a hold frame during which the data voltage written in the refresh frame is maintained, according to a driving frequency, wherein the parking voltage has different voltage levels in the refresh frame and the hold frame.

Features, structures, effects, etc. described in the above-described examples of the present disclosure are included in at least one embodiment of the present disclosure, and are not necessarily limited to only one embodiment. Furthermore, features, structures, effects, etc. illustrated in at least one example of the present disclosure may be combined or modified with respect to other examples by those of ordinary skill in the art to which this disclosure belongs. Accordingly, the contents related to such combinations and modification should be interpreted as being included in the scope of the present disclosure.

Although the embodiments of the present disclosure have been described in more detail with reference to the accompanying drawings, the present invention is not necessarily limited to these embodiments, and various modifications may be possible within the scope without departing from the technical spirit of the present invention. Accordingly, the embodiments disclosed in the present disclosure are not intended to limit the technical spirit of the present invention, but to exemplarily explain the present invention, and the scope of the technical spirit of the present invention is not limited by these embodiments. Therefore, there should be understood that the embodiments described above are illustrative in all respects and not restrictive. The protection scope of the present invention should be construed by the following claims, and all technical ideas within the scope equivalent thereto should be construed as being included in the scope of the present invention.

What is claimed is:

1. A display device comprising:

a display panel comprising a plurality of pixels, each of the plurality of pixels being connected to a data line and a gate line;

a data driver configured to drive by dividing a driving period into an active period in which a data voltage is applied to the data line and a blank period in which the data voltage is not applied;

a gate driver configured to apply a scan signal to the gate line; and a controller is configured to vary a driving frequency according to a refresh rate, wherein the gate driver is configured to apply the scan signal having a higher frequency than the driving frequency.

2. The display device of claim 1, wherein each of the plurality of pixels comprises a light emitting device and a pixel circuit for controlling driving of the light emitting device, wherein the light emitting device comprises an anode, a cathode, and an organic light emitting layer between the anode and the cathode, and wherein the pixel circuit comprises a plurality of switching devices, a driving switching device, and a capacitor.

3. The display device of claim 2, wherein the pixel circuit comprises:

first, second, third, fourth, and fifth nodes placed in different locations in the pixel circuit;

a first transistor comprising first, second, and gate electrodes respectively connected to the fourth node to which a first power voltage is applied, the second node corresponding to any one of source and drains electrodes of the driving switching device, and a first emission line for receiving an emission signal;

a second transistor comprising first, second, and gate electrodes respectively connected to the third node corresponding to the other one of the source and drains electrodes of the driving switching device, the fifth node corresponding to a pixel electrode of the light emitting device, and a second emission line for receiving the emission signal;

a third transistor comprising first, second, and gate electrodes respectively connected to the third node, a first bias voltage node to which a first bias voltage is applied, and a first gate line for receiving a first scan signal; and a fourth transistor comprising first, second, and gate electrodes respectively connected to the fifth node, a second bias voltage node to which a second bias voltage is applied, and the first gate line for receiving the first scan signal.

4. The display device of claim 3, wherein the fourth transistor is configured to be turned on in response to the first scan signal before the light emitting device emits light or after the light emitting device emits light.

5. The display device of claim 3, wherein the first and second bias voltages are supplied through different power supply lines.

6. The display device of claim 3, further comprising:

a light emission signal generator configured to adjust a duty ratio of the emission signal, wherein when the pixel circuit is driven at a first refresh rate, the light emission signal generator is configured to generate a first emission signal having a first duty ratio and supply the generated first emission signal to the pixel circuit, and when the pixel circuit is driven at a second refresh rate different from the first refresh rate, the light emission signal generator is configured to generate a second emission signal having a second duty ratio different from the first duty ratio and supply the generated second emission signal to the pixel circuit.

7. The display device of claim 6, wherein the gate driver is disposed on a first side of the display panel, and the light emission signal generator is disposed on a second opposing side of the display panel.

8. The display device of claim 3, wherein during low-speed driving, refresh and hold frames are alternately driven, and in the hold frame, the pixel electrode of the light emitting device is periodically initialized through the sixth transistor of the pixel circuit.

9. The display device of claim 2, wherein the gate driver is configured to supply a plurality of scan signals different from each other to the plurality of switching devices.

10. The display device of claim 1, further comprising:

a controller configured to vary a driving frequency in frame units according to an input image, and, according to the driving frequency, to operate a frame as a refresh frame for writing the data voltage, or operate by dividing the frame into the refresh frame and a hold frame.

11. The display device of claim 10, wherein the data driver is configured to apply a parking voltage to the data line during the blank period, and wherein when the display panel is driven at low luminance, the parking voltage is set to have different voltage levels in the refresh frame and the hold frame.

12. The display device of claim 1, wherein the frequency of the scan signal is twice the driving frequency.

13. A display device comprising:

a data driver configured to supply a data voltage to a data line in a display panel during an active period and supply a parking voltage to the data line in the display panel during a blank period;

a gate driver configured to apply a scan signal to the gate line; and a controller configured to operate a frame as a refresh frame for writing the data voltage and/or a hold frame during which the data voltage written in the refresh frame is maintained, according to a driving frequency, wherein the controller is configured to vary the driving frequency according to a refresh rate, and the gate driver is configured to apply the scan signal having a higher frequency than the driving frequency, and wherein respective parking voltages in the refresh frame and the hold frame have different voltage levels or a same voltage level.

14. The display device of claim 13, wherein the parking voltage in the refresh frame has a first voltage level, and the parking voltage in the holding frame has a second voltage level lower than the first voltage level.

15. The display device of claim 14, wherein the parking voltage is a first parking voltage having the same first voltage level as the data voltage of a low gray level in the refresh frame, and the parking voltage is a second parking voltage having the second voltage level for reducing flicker in the hold frame.

16. The display device of claim 13, wherein the parking voltage is a first parking voltage having a same voltage level as a data voltage of a low gray level in the refresh frame.

17. The display device of claim 13, wherein the parking voltage is a second parking voltage having a voltage level for reducing flicker in the hold frame.

18. A display device comprising:

a display panel comprising a plurality of pixels, wherein each of the plurality of pixels being connected to a data line and a gate line;

a data driver configured to drive by dividing a driving period into an active period in which a data voltage is applied to the data line and a blank period in which the data voltage is not applied, and apply a parking voltage to the data line during the blank period;

a gate driver configured to apply a scan signal to the gate line; and a controller configured to vary a driving frequency in frame units according to an input image, and, according to the driving frequency, to operate a frame as a refresh frame for writing the data voltage, or operate by dividing the frame into the refresh frame and a hold frame, wherein the data voltage written in the refresh frame is maintained during the hold frame, wherein a voltage level of the parking voltage varies according to the driving frequency, when the driving frequency corresponds to a first refresh rate, the parking voltage has a first voltage level, and when the driving frequency corresponds to a second refresh rate lower than the first refresh rate, the parking voltage changes over time from the first voltage level to a second voltage level lower than the first voltage level.

19. The display device of claim 18, wherein the parking voltage has different voltage levels in the refresh frame and the hold frame.

* * * * *